(12) United States Patent
Celik et al.

(10) Patent No.: US 8,761,744 B2
(45) Date of Patent: Jun. 24, 2014

(54) MOBILE VIRTUAL COMMUNICATION INVITATIONS

(75) Inventors: Feyzi Celik, Hopkinton, MA (US); Christopher DeGrace, Cambridge, MA (US); Andrea Yanik, Boston, MA (US)

(73) Assignee: Lupine Investments LLC, Wilmington, DE (US)

( * ) Notice: Subject to any disclaimer, the term of this patent is extended or adjusted under 35 U.S.C. 154(b) by 1177 days.

(21) Appl. No.: 12/106,183

(22) Filed: Apr. 18, 2008

(65) Prior Publication Data

US 2008/0261577 A1 Oct. 23, 2008

Related U.S. Application Data

(60) Provisional application No. 60/913,187, filed on Apr. 20, 2007.

(51) Int. Cl.
| | |
|---|---|
| *H04M 3/42* | (2006.01) |
| *H04B 1/38* | (2006.01) |
| *H04W 4/00* | (2009.01) |
| *G06F 15/16* | (2006.01) |
| *H04L 9/32* | (2006.01) |
| *H04K 1/00* | (2006.01) |

(52) U.S. Cl.
USPC ........ 455/416; 455/558; 455/435.2; 455/466; 709/229; 713/170; 380/270

(58) Field of Classification Search
USPC ......................................................... 455/416
See application file for complete search history.

(56) References Cited

U.S. PATENT DOCUMENTS

| | | | | |
|---|---|---|---|---|
| 4,654,793 | A | 3/1987 | Elrod | 364/401 |
| 4,774,618 | A | 9/1988 | Raviv | 360/133 |
| 4,945,218 | A | 7/1990 | Talbott | 235/487 |
| 5,483,052 | A | 1/1996 | Smith, III et al. | 235/472 |
| 5,493,105 | A | 2/1996 | Desai | 235/375 |

(Continued)

FOREIGN PATENT DOCUMENTS

| | | |
|---|---|---|
| CN | 1567936 A | 1/2005 |
| CN | 1589046 | 3/2005 |

(Continued)

OTHER PUBLICATIONS

Dawson et al., "vCard MIME Directory Profile; rfc2426.txt", IETF Standard, Internet Engineering Task Force, IETF, CH, pp. 1-42 (1998).

(Continued)

*Primary Examiner* — Timothy Pham
(74) *Attorney, Agent, or Firm* — Novak Druce Connolly Bove + Quigg LLP

(57) ABSTRACT

In general, in an aspect, the invention provides a method including prompting a first user of a first mobile communication device to invite a second user of a second mobile communication device to become associated with a virtual community associated with the first user, sending a first notification from the first mobile communication device to a gateway in response to the first user inviting the second user to become associated with the virtual community, sending a second notification from the gateway to the second mobile communication device indicating that the first user is inviting the second user to become associated with the virtual community, and prompting the second user, upon receiving the second notification at the second mobile communication device, to become associated with the virtual community.

12 Claims, 5 Drawing Sheets

(56) References Cited

U.S. PATENT DOCUMENTS

| | | | |
|---|---|---|---|
| 5,590,197 A | 12/1996 | Chen et al. | 380/24 |
| 5,604,640 A | 2/1997 | Zipf et al. | 359/803 |
| 5,612,524 A | 3/1997 | Sant'Anselmo et al. | 235/494 |
| 5,640,565 A | 6/1997 | Dickinson | 395/683 |
| 5,671,279 A | 9/1997 | Elgamal | 380/23 |
| 5,671,282 A | 9/1997 | Wolff et al. | 380/25 |
| 5,678,041 A | 10/1997 | Baker et al. | 395/609 |
| 5,689,654 A | 11/1997 | Kikinis et al. | 395/281 |
| 5,692,073 A | 11/1997 | Cass | 382/219 |
| 5,715,399 A | 2/1998 | Bezos | 395/227 |
| 5,732,229 A | 3/1998 | Dickinson | 395/334 |
| 5,740,549 A | 4/1998 | Reilly et al. | 705/14 |
| 5,774,117 A | 6/1998 | Kukkal et al. | 345/330 |
| 5,791,991 A | 8/1998 | Small | 463/41 |
| 5,793,972 A | 8/1998 | Shane | 395/200.49 |
| 5,794,219 A | 8/1998 | Brown | 705/37 |
| 5,794,232 A | 8/1998 | Mahlum et al. | 707/3 |
| 5,806,043 A | 9/1998 | Toader | 705/14 |
| 5,848,412 A | 12/1998 | Rowland et al. | 707/9 |
| 5,878,397 A | 3/1999 | Stille et al. | |
| 5,987,136 A | 11/1999 | Schipper et al. | 380/25 |
| 6,092,133 A | 7/2000 | Erola et al. | 710/102 |
| 6,094,573 A | 7/2000 | Heinonen et al. | 455/412 |
| 6,115,711 A | 9/2000 | White | 707/10 |
| 6,161,113 A | 12/2000 | Mora et al. | 707/505 |
| 6,161,124 A | 12/2000 | Takagawa et al. | 709/203 |
| 6,185,553 B1 | 2/2001 | Byrd et al. | 707/3 |
| 6,199,099 B1 | 3/2001 | Gershman et al. | |
| 6,324,587 B1 | 11/2001 | Trenbeath et al. | |
| 6,346,881 B1 | 2/2002 | Davidson | |
| 6,356,905 B1 | 3/2002 | Gershman et al. | |
| 6,374,259 B1 | 4/2002 | Celik | 707/104 |
| 6,433,795 B1 | 8/2002 | MacNaughton et al. | 345/738 |
| 6,459,904 B1 | 10/2002 | Lorello et al. | |
| 6,564,261 B1 | 5/2003 | Gudjonsson et al. | 709/227 |
| 6,615,057 B1 | 9/2003 | Pettersson | 455/558 |
| 6,633,311 B1 | 10/2003 | Douvikas et al. | |
| 6,654,768 B2 | 11/2003 | Celik | 707/104.1 |
| 6,694,353 B2 | 2/2004 | Sommerer | |
| 6,810,405 B1 | 10/2004 | LaRue et al. | |
| 6,859,650 B1 | 2/2005 | Ritter | 455/406 |
| 6,859,829 B1 | 2/2005 | Parupudi et al. | 709/224 |
| 6,868,451 B1 | 3/2005 | Peacock | 709/231 |
| 6,973,477 B1 | 12/2005 | Martino | 709/203 |
| 7,146,165 B2 | 12/2006 | Manner et al. | 455/432.3 |
| 7,222,147 B1 | 5/2007 | Black et al. | 709/200 |
| 7,225,244 B2 | 5/2007 | Reynolds et al. | 709/223 |
| 7,296,036 B2 | 11/2007 | Celik | 707/201 |
| 7,349,907 B2 | 3/2008 | Celik | 707/10 |
| 7,353,044 B2 | 4/2008 | Nachef | 455/558 |
| 7,447,510 B2 | 11/2008 | Celik et al. | 455/466 |
| 7,509,349 B2 | 3/2009 | Celik | |
| 2001/0020239 A1 | 9/2001 | Ukigawa et al. | |
| 2001/0044321 A1 | 11/2001 | Ausems et al. | |
| 2002/0138470 A1 | 9/2002 | Zhou | |
| 2003/0009374 A1 | 1/2003 | Moodie et al. | |
| 2003/0009385 A1 | 1/2003 | Tucciarone et al. | |
| 2003/0022697 A1 | 1/2003 | Chen et al. | |
| 2003/0073440 A1 | 4/2003 | Mukherjee et al. | 455/435 |
| 2003/0083078 A1 | 5/2003 | Allison et al. | 455/466 |
| 2003/0135586 A1 | 7/2003 | Minborg et al. | |
| 2003/0163598 A1 | 8/2003 | Wilson et al. | 709/318 |
| 2003/0172138 A1 | 9/2003 | McCormack et al. | |
| 2003/0236769 A1 | 12/2003 | Pyhalammi | |
| 2004/0024846 A1 | 2/2004 | Randall et al. | 709/219 |
| 2004/0093317 A1 | 5/2004 | Swan | 707/1 |
| 2004/0128151 A1 | 7/2004 | Mock et al. | |
| 2004/0199598 A1 | 10/2004 | Kalfas | 709/207 |
| 2004/0235503 A1 | 11/2004 | Koponen et al. | 455/466 |
| 2004/0242216 A1 | 12/2004 | Boutsikakis | |
| 2004/0249846 A1 | 12/2004 | Randall et al. | 707/102 |
| 2005/0021571 A1 | 1/2005 | East | 707/201 |
| 2005/0047582 A1 | 3/2005 | Shaffer et al. | 379/265.11 |
| 2005/0059418 A1 | 3/2005 | Northcutt | |
| 2005/0102328 A1 | 5/2005 | Ring et al. | 707/201 |
| 2005/0117523 A1 | 6/2005 | Parupudi et al. | |
| 2005/0122909 A1 | 6/2005 | Parupudi et al. | |
| 2005/0122910 A1 | 6/2005 | Parupudi et al. | |
| 2005/0149487 A1 | 7/2005 | Celik | 707/1 |
| 2005/0208927 A1 | 9/2005 | Wong et al. | 455/412.1 |
| 2006/0031237 A1 | 2/2006 | DeAnna et al. | 707/100 |
| 2006/0041590 A1 | 2/2006 | King et al. | |
| 2006/0089130 A1 | 4/2006 | Yamamura et al. | |
| 2006/0101266 A1 | 5/2006 | Klassen et al. | 713/170 |
| 2006/0177034 A1* | 8/2006 | Reding et al. | 379/211.02 |
| 2006/0212482 A1 | 9/2006 | Celik | |
| 2006/0235931 A1 | 10/2006 | Ruthe et al. | |
| 2006/0290496 A1 | 12/2006 | Peeters | |
| 2007/0021111 A1 | 1/2007 | Celik | |
| 2007/0061420 A1 | 3/2007 | Basner | |
| 2007/0067503 A1* | 3/2007 | Hiroki | 710/15 |
| 2007/0181675 A1 | 8/2007 | Drummond et al. | 235/381 |
| 2008/0015998 A1 | 1/2008 | Celik | |
| 2008/0032742 A1 | 2/2008 | Celik et al. | |
| 2008/0090597 A1 | 4/2008 | Celik et al. | |
| 2008/0096590 A1 | 4/2008 | Celik et al. | |
| 2008/0130554 A1 | 6/2008 | Gisby et al. | |
| 2008/0257952 A1 | 10/2008 | Zandonadi | 235/379 |
| 2008/0261577 A1 | 10/2008 | Celik et al. | |
| 2008/0307511 A1* | 12/2008 | Ahtisaari | 726/4 |
| 2009/0042590 A1 | 2/2009 | Celik et al. | |
| 2009/0097633 A1 | 4/2009 | James, Jr. et al. | |
| 2009/0119339 A1 | 5/2009 | Celik | |
| 2009/0164519 A1 | 6/2009 | Vainio | |
| 2009/0176485 A1 | 7/2009 | Michaels et al. | |
| 2009/0221307 A1* | 9/2009 | Wolak et al. | 455/466 |
| 2009/0254572 A1 | 10/2009 | Redlich et al. | |
| 2009/0327282 A1 | 12/2009 | Wittig et al. | |

FOREIGN PATENT DOCUMENTS

| | | |
|---|---|---|
| EP | 1024674 A1 | 8/2000 |
| EP | 1189412 A2 | 3/2002 |
| EP | 1372327 A1 | 12/2003 |
| EP | 1 677 186 A1 | 7/2006 |
| GB | 2399255 A | 9/2004 |
| RU | 2246754 | 2/2005 |
| WO | WO 97/01137 | 1/1997 |
| WO | WO 98/03923 | 1/1998 |
| WO | WO 98/06055 | 2/1998 |
| WO | WO 98/24036 | 6/1998 |
| WO | WO 99/29127 | 6/1999 |
| WO | WO 02/39300 | 5/2002 |
| WO | 02098146 A2 | 12/2002 |
| WO | WO-03098409 A1 | 11/2003 |
| WO | WO-2004056140 A1 | 7/2004 |
| WO | WO-2006011995 A2 | 2/2006 |
| WO | WO-2006088627 A2 | 8/2006 |
| WO | WO 2007/031708 A1 | 3/2007 |
| WO | WO-2007094823 A1 | 8/2007 |
| WO | WO-2008016553 A2 | 2/2008 |
| WO | WO-2008051276 A2 | 5/2008 |
| WO | WO-2008057349 A2 | 5/2008 |
| WO | WO-2008130653 A1 | 10/2008 |

OTHER PUBLICATIONS

ETSI Standards, European Telecommunications Standards Institute, Sophia-Antipo, FR, "Digital cellular telecommunications system (Phase 2+); Universal Mobile Telecommunications System (UMTS); Technical realization of Short Message Service (SMS) (3GPP TS 23.040 version 6.6.0 Release 6); ETSI TS 123 040", 3-T2(V660):1-192 (2005).

ETSI Standards, European Telecommunications Standards Institute, Sophia-Antipo, FR, "Smart cards; ETSI numbering system for telecommunication application providers (Release 7); ETSI TS 101 220", SCP-WG1(V740):1-27 (2006).

Howes et al., "A MIME Content-Type for Directory Information; rfc2425.txt", IETF Standard, Internet Engineering Task Force, IETF, CH, pp. 1-33 (1998).

Versit Consortium, "vCard—The Electronic Business Card—Version 2.1—Specifications", Internet citation, [Online] Sep. 18, 1996,

(56) References Cited

OTHER PUBLICATIONS

XP002318282, retrieved from Internet: URL:http://www.imc.org/pdi/vacrd-21.doc> [retrieved on Feb. 18, 2005], pp. 1-40.
U.S. Appl. No. 12/423,711, filed Apr. 14, 2009, Celik.
U.S. Appl. No. 12/423,715, filed Apr. 14, 2009, Celik.
U.S. Appl. No. 12/423,717, filed Apr. 14, 2009, Celik.
U.S. Appl. No. 60/102,614, filed Oct. 1, 1998, Celik.
U.S. Appl. No. 60/862,453, filed Oct. 22, 2006, Celik.
U.S. Appl. No. 60/863,899, filed Nov. 1, 2006, Celik.
U.S. Appl. No. 60/913,187, filed Apr. 20, 2007, Celik.
U.S. Appl. No. 61/049,263, filed May 12, 1980, Nakano.
U.S. Appl. No. 61/083,377, filed Sep. 2, 1980, Liang.
U.S. Appl. No. 61/109,722, filed Oct. 30, 2008, Celik.
George Kambourakis et al., "Delivering Attribute Certificates over GPRS", 2004, ACM, NY, NY, pp. 1166-1170.
International Search Report for PCT/US06/38589, mailed Apr. 30, 2007.
International Search Report for PCT/US2006/009262, mailed Mar. 31, 2009.
Ulrike Meyer et al., "A man-in-the-middle attack on UMTS", 2004, ACM, NY, NY, pp. 90-97.
International Search Report and Written Opinion from PCT/US08/05062.
Search Report and Opinion from EP08103640, dated Aug. 21, 2008.
Communication pursuant to Article 94(3) of the EPC, EP Applicatoin 07118156.4, dated Oct. 9, 2009.
U.S. Appl. No. 61/049,263; Celik, filed Apr. 30, 2008.
U.S. Appl. No. 61/083,377; Celik, filed Jul. 24, 2008.

\* cited by examiner

MOBILE VIRTUAL COMMUNICATION INVITATIONS

CROSS-REFERENCE TO RELATED ACTIONS

This application claims the benefit of U.S. Provisional Application No. 60/913,187 filed Apr. 20, 2007, which is incorporated by reference herein in its entirety.

BACKGROUND

Interaction between people in society is an important part of daily life. Typical interaction between people includes the use of mobile communication devices such as mobile telephones and the use of virtual communities. While it is relatively easy to interact with another person using a mobile telephone, it is somewhat harder to interact with other people through the use of a virtual community. Traditionally, there have been difficulties with enticing people to sign-up for any given virtual community. The cause of this difficulty can be attributed to factors such as the sheer number of virtual communities and the fact that a person must take the step of actively signing up for a virtual community by manually creating an account using a computer. Furthermore, once individuals chose to use a particular virtual community, the individuals do not have an easy mechanism to invite other individuals to that community using a mobile communication device.

SUMMARY

In general, in an aspect, the invention provides a method including prompting a first user of a first mobile communication device to invite a second user of a second mobile communication device to become associated with a virtual community associated with the first user, sending a first notification from the first mobile communication device to a gateway in response to the first user inviting the second user to become associated with the virtual community, sending a second notification from the gateway to the second mobile communication device indicating that the first user is inviting the second user to become associated with the virtual community, and prompting the second user, upon receiving the second notification at the second mobile communication device, to become associated with the virtual community.

Implementations of the invention may provide one or more of the following features. The method includes determining if the second mobile communication device is capable of enhanced service. The method includes sending a short message service (SMS) message of a first type if the second mobile communication device is capable of enhanced service, and sending an SMS message of a second type if the second mobile communication device is not capable of enhanced service. The method includes receiving the second notification from the gateway and prompting a second user to become associated with the virtual community of the first user. The method includes sending a third notification to a server indicating that the second user accepted the invitation. The method includes associating the second user with the virtual community. The method includes prompting of the first user automatically in response to the completion of a communication event. The method includes prompting of the first user automatically in response to the completion of at least one of an e-mail, an instant message, a short message service (SMS) message, and a telephone call. The method includes sending a confirmation e-mail to the second user, wherein the e-mail includes an activation link. The method includes accessing the virtual community using at least one of the first and second communication devices. The method includes accessing the virtual community using a wireless application protocol session.

In general, in another aspect, the invention provides a computer readable medium encoded with computer readable instructions that, when executed by a processor, are configured to cause the processor to detect the completion of a communication event between first and second mobile communication devices, prompt a first user of the first mobile communication device to invite a second user of the second mobile communication device to become associated with a virtual community associated with the first user, and send a first notification from the first mobile communication device to a gateway in response to the first user inviting the second user to become associated with the virtual community.

Implementations of the invention may provide one or more of the following features. The computer readable instructions are further configured to cause the processor to prompt the first user automatically in response to the completion of the communication event. The computer readable instructions are configured such that the first notification is a short message service (SMS) message. The computer readable instructions are configured such that the SMS message has a predetermined format that is recognizable by the gateway. The computer readable instructions are further configured to cause the processor to receive an incoming notification and to recognize the incoming notification as a invitation from the second user inviting the first user to become associated with a virtual community associated with the second user. The computer readable instructions are further configured to cause the processor to display a prompt to the first user in response to receiving the incoming notification. The computer readable instructions are further configured such that the detection of the completion of the communication event includes detection of the completion of at least one of an e-mail, an instant message, a short message service (SMS) message, and a telephone call.

In general, in another aspect, the invention provides a computer readable medium encoded with computer readable instructions that, when executed by a processor, are configured to cause the processor to receive a first incoming notification from a first user of a first mobile communication device, detect that the first incoming notification is a invitation from a first user to a second user of a second mobile communication device, wherein the invitation is a request that the second user become associated with a virtual community associated with the first user, determine if the second mobile communication device is capable of enhanced service, send a first outgoing notification to the second mobile communication device including information indicative of the invitation, and receiving a response from the second mobile communication device.

Implementations of the invention may provide one or more of the following features. The computer readable instructions are configured such that the first outgoing notification is a short message service (SMS) message. The computer readable instructions are configured such that the SMS message is of a first type if the second mobile communication device is capable of enhanced service, and the SMS message is of a second type if the second mobile communication device is not capable of enhanced service. The computer readable instructions are further configured to cause the processor to send a second outgoing notification to a server associated with the virtual community indicating that the second user accepted the invitation. The computer readable instructions are further configured to cause the processor to send a third outgoing notification to the first mobile communication device indicating that the second user accepted the invitation.

In general, in another aspect, the invention provides a computer readable medium encoded with computer readable instructions that, when executed by a processor, are configured to cause the processor to receive an incoming notification from a first communication device to a second communication device, the incoming notification being received at the second communication device, wherein the incoming notification is an invitation by a first user of the first communication device inviting a second user of the second communication device to become associated with a virtual community associated with the first user, recognize the incoming notification as an invitation by the first user inviting the second user to become associated with the virtual community associated with the first user, prompt the second user to accept the invitation, and receive a response to the prompt.

Implementations of the invention may provide one or more of the following features. The computer readable instructions are further configured to cause the processor to provide an outgoing notification including information indicative of whether the second user accepted the invitation. The computer readable instructions are further configured to cause the processor to recognize the incoming notification by recognizing at least one of a format of the incoming notification and information contained in the incoming notification. The computer readable instructions are further configured to cause the processor to prompt the second user to invite the first user to become associated with a virtual community associated with the second user. The computer readable instructions are further configured to cause the processor to connect to the virtual community associated with the first user using a wireless application protocol session.

Various aspects of the invention may provide one or more of the following capabilities. A first user may more efficiently associate a second user with the first user's virtual community. A first user may more efficiently share contact information with a second user. A first user may automatically associate a second user with the first user's virtual community. A first user may more efficiently increase the number of other users associated with the first user's virtual community.

These and other capabilities of the invention, along with the invention itself, will be more fully understood after a review of the following figures, detailed description, and claims.

DETAILED DESCRIPTION

Embodiments of the invention provide techniques for users of mobile devices to invite and include other users to their virtual communities (e.g., communities hosted on social networking sites such as MySpace, LinkedIn, Facebook, Instant Messenger, ICQ, itsmy.com, etc.) via their mobile communication devices and/or personal computers. A first user's mobile communication device includes a mobile application (e.g., SocialLinq) that is configured to cause the first user's mobile communication device to provide a prompt to the first user after the completion of a communication between the first user and a second user. The prompt provides the first user the option to invite the second user to join one or more virtual communities that the first user is associated with. The first user's mobile communication device sends a notification to a service provider if the first user chooses to invite the second user to become associated with the first user's virtual community (e.g., by "linking" the second user to first user's virtual community).

The service provider is configured to determine if the second mobile communication device includes the mobile application. The service provider is configured to send a notification to the second user's mobile communication device; the format of which varies depending on whether or not the second user's mobile communication device includes the mobile application. The notification sent to the second user's mobile communication device is configured to cause the second user's mobile communication device to prompt the second user to become associated with the first user's virtual community. If the second user accepts the invitation, the service provider is configured to send a notification to the operator of the virtual community informing it of the same. Embodiments of the invention are virtual community agnostic, and can be configured to work with various virtual communities and/or services. Other embodiments are within the scope of the invention.

Figure 1:
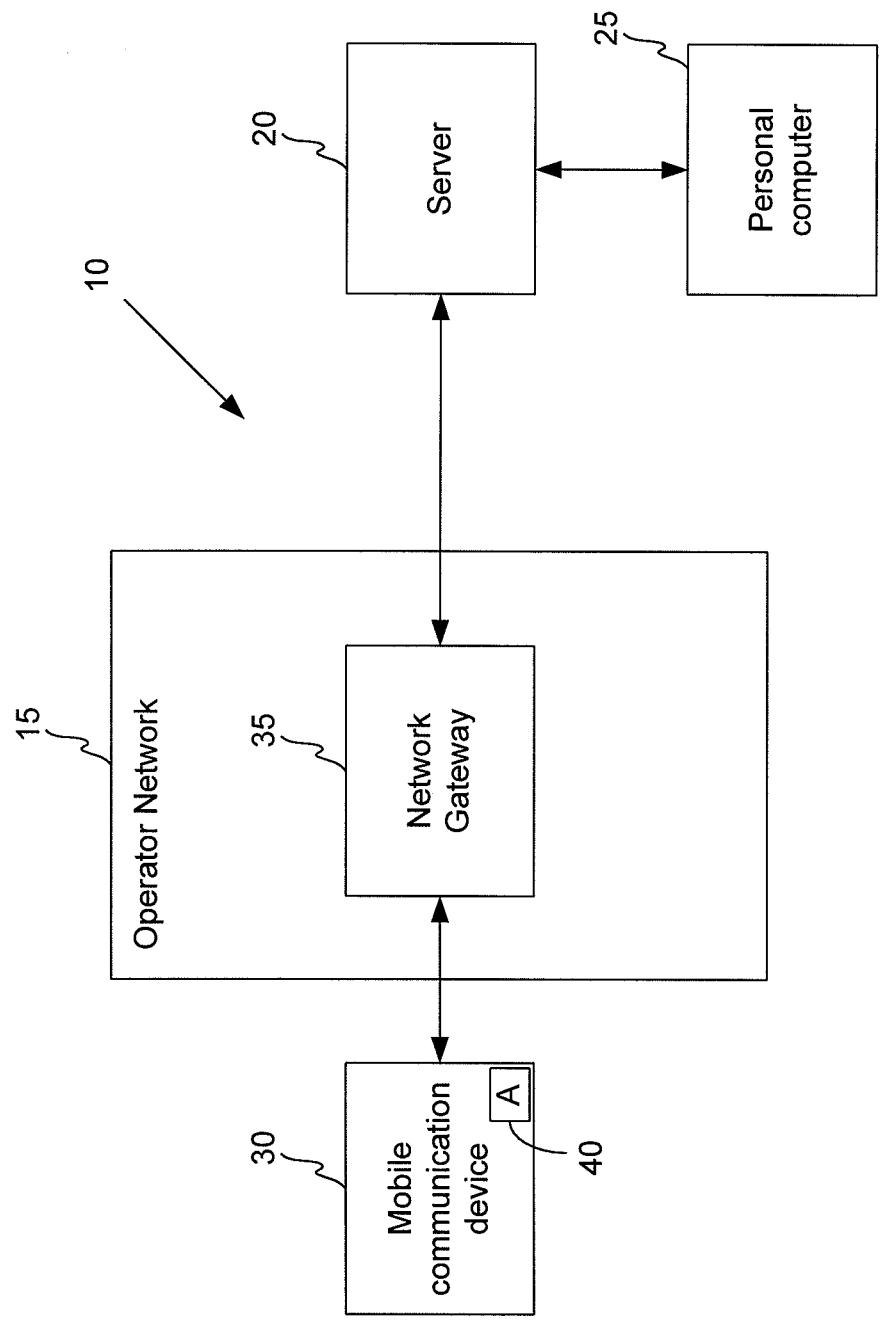
FIG. 1 is a schematic diagram of a communication system.

Referring to FIG. 1, a system 10 includes a service provider 15, a server 20, a personal computer 25, and a mobile communication device 30. The system 10 can be configured to provide communication services (e.g., peer-to-peer) to users via, for example, the mobile communication device 30 and the personal computers 25. While the system 10 is configured as shown in FIG. 1, the system 10 may also contain additional ones of the service provider 15, the server 20, the personal computer 25, the mobile communication device 30, and/or the network gateway 35.

The service provider 15 is configured to provide mobile communication service to the mobile communication device 30, including voice and/or data service, although other services can also be provided. The service provider 15 is operated by, for example, a voice/data service provider such as Verizon Wireless, T-Mobile, Vodafone, and/or Claro. The service provider 15 can provide services to the mobile communication device 30 via one or more configurations such as universal mobile telecommunications system (UMTS) global system for mobile communications (GSM), time-division multiple Access (TDMA), code division Multiple access (CDMA), and personal digital cellular (PDC). The service provider 15 further includes a network gateway 35. The network gateway 35 is configured to communicate with the server 20 via a network connection such as the Internet, or a point-to-point link (e.g., via a wired and/or wireless connection). While not shown in FIG. 1, the service provider 15 also includes other components typically used by voice/data service providers to implement the desired functionality such as networking equipment, telephony equipment, amplifiers, data storage devices, and antennas.

The server 20 is configured to, for example, host virtual communities such as those provided by MySpace, LinkedIn, Facebook, Instant Messenger, ICQ, itsmy.com, etc., although the server can be configured to host other programs and services as well. The virtual communities described herein can be web-based (e.g., can be accessed through a web-browser) and/or can be mobile-based (e.g., can only be accessed through a mobile communication device). The server 20 is a server such as those made by Dell Incorporated of Round Rock, Tex., although other servers can be used. The server 20 is configured to communicate with the personal computer 25 via a network connection such as the Internet or a point-to-point link. The personal computer 25 is configured to interface with the server 20 in order to, for example, retrieve web pages, receive and send e-mails, provide voice service, etc. For example, the personal computer 25 can be an ordinary household computer, although other configurations are possible.

The mobile communication device 30 is configured to provide voice and data services to a user, and is, for example, a mobile-phone, a Blackberry, and/or a personal digital assistant ("PDA"). The mobile communication device 30 can be configured to include a subscriber identity module (SIM) card, although other configurations are possible. The mobile communication device 30 is configured to include a mobile application 40 that is configured to implement the desired functionality within the mobile device 30. The mobile application 40 can be implemented using computer readable instructions that are stored on a computer readable medium (e.g., a SIM card, an optical disk (e.g., CD, DVD), a magnetic medium (e.g., a hard-drive, floppy disk), and solid state memory (e.g., RAM, ROM, EEPROM)). The computer readable instructions can be stored in a memory contained in the mobile communication device, a SIM card, and/or can be downloaded from a computer readable medium and/or from a network connection.

The mobile communication device 30 is configured to include the mobile application 40. The mobile application 40 includes computer readable instructions that, when executed by a computer (e.g., a processor included in the mobile communication device 30), are configured to cause the computer to carry out the functionality described herein. When a user obtains the mobile communication device 30 (or obtains a new SIM card for use with the mobile communication device 30), the mobile application 40 is preferably provided to the mobile communication device 30 automatically (e.g., the first time the mobile communication device 30 is turned on) or at other times (e.g., when the user of the mobile communication device 30 elects to download the application 40). Alternatively, the service provider 15 can be configured to automatically "push" the application 40 to the mobile communication device 30 and/or the mobile communication device 30 can come preloaded with the mobile application 40. The mobile application 40 can also be pushed onto the mobile communication device 30 by a user using the personal computer 25.

A setup process can be provided to the user of the mobile communication device 30 to enable the user's ability to use the mobile application 40. The setup process can be provided by the service provider 15 (e.g., via a "push" process) or can be provided by the mobile application 40 itself. Preferably, the setup process is only presented to the user after first enabling the mobile application 40, although the setup process can occur at other times as well.

During the setup process, a user's mobile communication device is preferably linked with the user's account on a virtual community. The mobile application 40 is configured to prompt the user to select a virtual community used by the user. For example, the user can indicate to the application 40 that the user has a MySpace account. The application 40 is configured to prompt the user to input the user's user ID that is associated with the user's virtual community account (e.g., the user can be prompted to input a MySpace account user ID). The application 40 is configured to send a setup notification to the gateway 35 that includes, for example, the user ID that is associated with the user's virtual community account (e.g., an e-mail address). Additionally, the mobile application 40 is configured to gather (e.g., by prompting the user to provide) and provide other information to the gateway 35 such as e-mail addresses, telephone numbers, device information (e.g., a Mobile Station Integrated Services Digital Network (MSISDN) number), etc. The notification can be, for example, a short message service (SMS) message, an e-mail, a phone call, a ping, a page, another type of message, and another types of interoperable transport mechanism.

The gateway 35 is configured to provide desired information to the server 20. For example, the gateway 35 can be configured to further process the information received by the mobile communication device 30 and/or to collect additional information relating to the mobile communication device 30. The gateway 35 is configured to provide the desired information to the server 20. The gateway 35 is configured to create a unique number (e.g., a hash code) as a function of a Mobile Station Integrated Services Digital Network (MSISDN) number associated with the user's mobile communication device 30. The gateway 35 is configured to send the information associated with the user (e.g., the hash code, the MSISDN number, the virtual community ID, etc.) to the server 20. The location and/or address of the server 20 that the network gateway 35 sends the desired information associated with the user can vary depending on the virtual community selected by the user (e.g., different virtual communities can use different ones of the server 20). The gateway 35 is preferably configured to relay the information to the server 20 from the mobile communication device 30 using a network connection such as the Internet or a point-to-point connection.

The server 20 is configured to use the information provided by the gateway 35 to provide access to the user's account (e.g., to provide the ability for the user to prompt other users to join the user's virtual community). For example, the server 20 is configured to match the user ID with an account in the virtual community and then to link the MSISDN number with the user's virtual community account. The server 20 is configured to send an acknowledgement notification to the user indicating that the user attempted to register the mobile communication device 30 with the server 20. For example, the server 20 can be configured to send an e-mail and/or SMS message to the user that includes an "activation" link (e.g., an HTML link) that the user can click on to complete the setup process. The activation link can be accessed using, for example, the personal computer 25 and/or the mobile device 30.

The server 20 is configured such that when the user completes the activation process using, for example, using the personal computer 25 and/or the mobile communication device 30, the server 20 is configured to cause the personal computer 25 and/or mobile communication device 30 to prompt the user to enter the user's virtual community user-name and password. For example, the server 20 can be configured to provide a web page to the personal computer 25 and/or mobile communication device 30 which is displayed to the user in order to obtain additional desired information.

Upon successful activation by the user, the server 20 is configured to send a notification to the gateway 35, although the notification can be sent to the gateway 35 at other times. Preferably, the notification sent to the gateway 35 includes, for example, a unique identifier of the user (e.g., an MSISDN number, a phone number, etc.), a user name associated with the virtual community, an identification of an associated virtual community, information entered by the user (e.g., a user ID for a specific virtual community), and/or other subscriber-specific information. Upon receiving the network notification from the server 20, the gateway 35 is configured to create a pointer from the user's unique code (e.g., the hash code) to the user's e-mail address and/or virtual community account. At least a portion of the setup process can be repeated such that the user can register with multiple virtual communities. Furthermore, the setup process described above can be accomplished using the personal computer 25 rather than the mobile communication device 30. The gateway 35 can be configured such that a confirmation notification is sent to the personal computer 25 and/or the mobile communication device 30.

Figure 2:
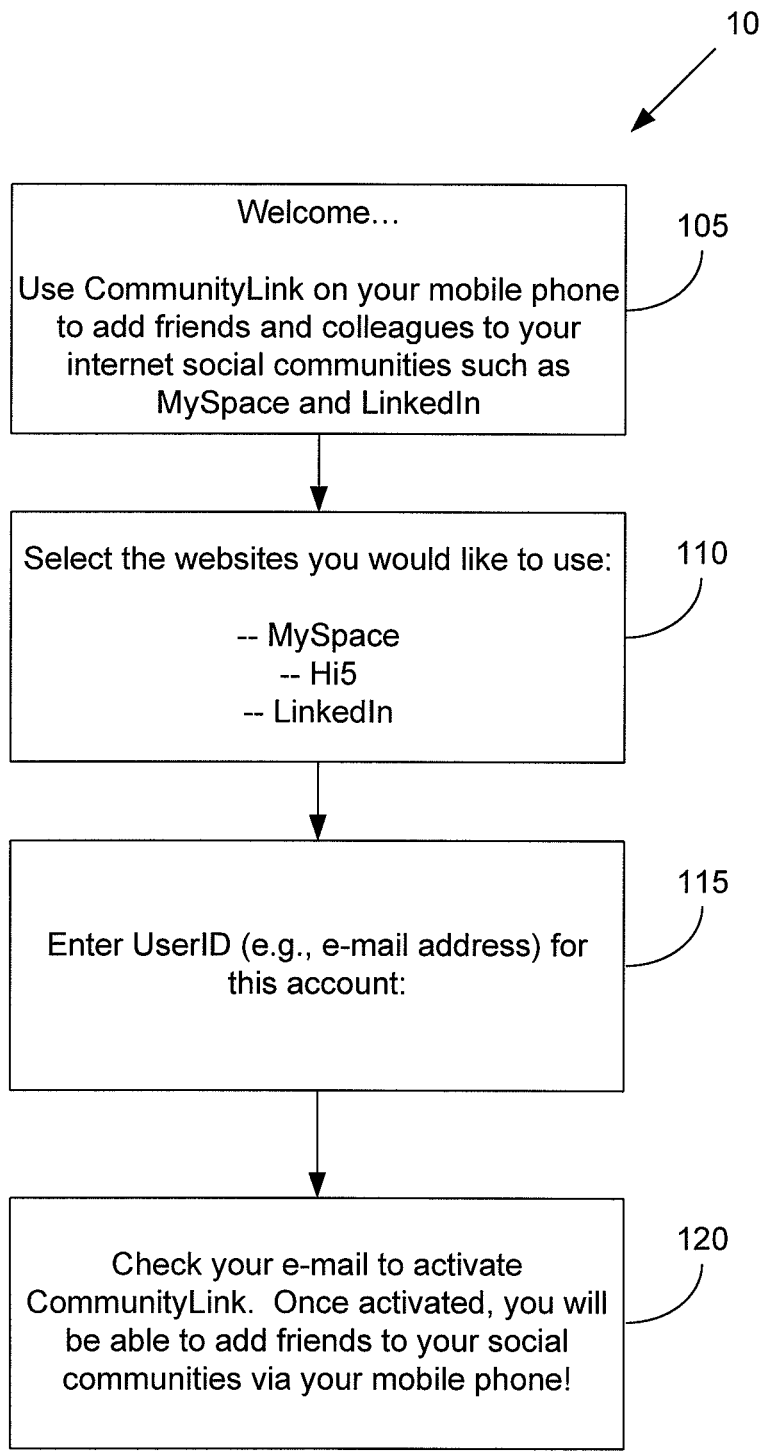
FIG. 2 is a diagram of a process carried out by the communication system shown in FIG. 1.

Referring to FIG. 2, a exemplary setup sequence 100 is shown. The sequence 100, however, is exemplary only and not limiting. The sequence 100 may be altered, e.g., by having stages added, removed, altered, and/or rearranged. While certain stages described below describe prompts provided to the user, these prompts are exemplary only, and other prompts may be provided.

At stage 105, an introduction prompt is shown to the user. The introduction prompt can include, for example, information and instructions about the setup process.

At stage 110, the user is prompted to select and/or input which virtual community the user is associated with and would like to register with. For example, the user can select from a list of one or more virtual communities supported by the service provider 15.

At stage 115, the user is prompted to input the user's ID that is associated with the selected virtual community. For example, the user can be prompted to input an e-mail address, telephone number, userID, member number, personal identification number, etc.

At stage 120, the user is prompted to check the user's e-mail to finish the setup process by clicking on an activation link contained in an e-mail sent to the user. Stage 120 typically occurs after the network gateway 35 relays the information input by the user to the server 20, although stage 120 can occur at other times.

Figure 3:
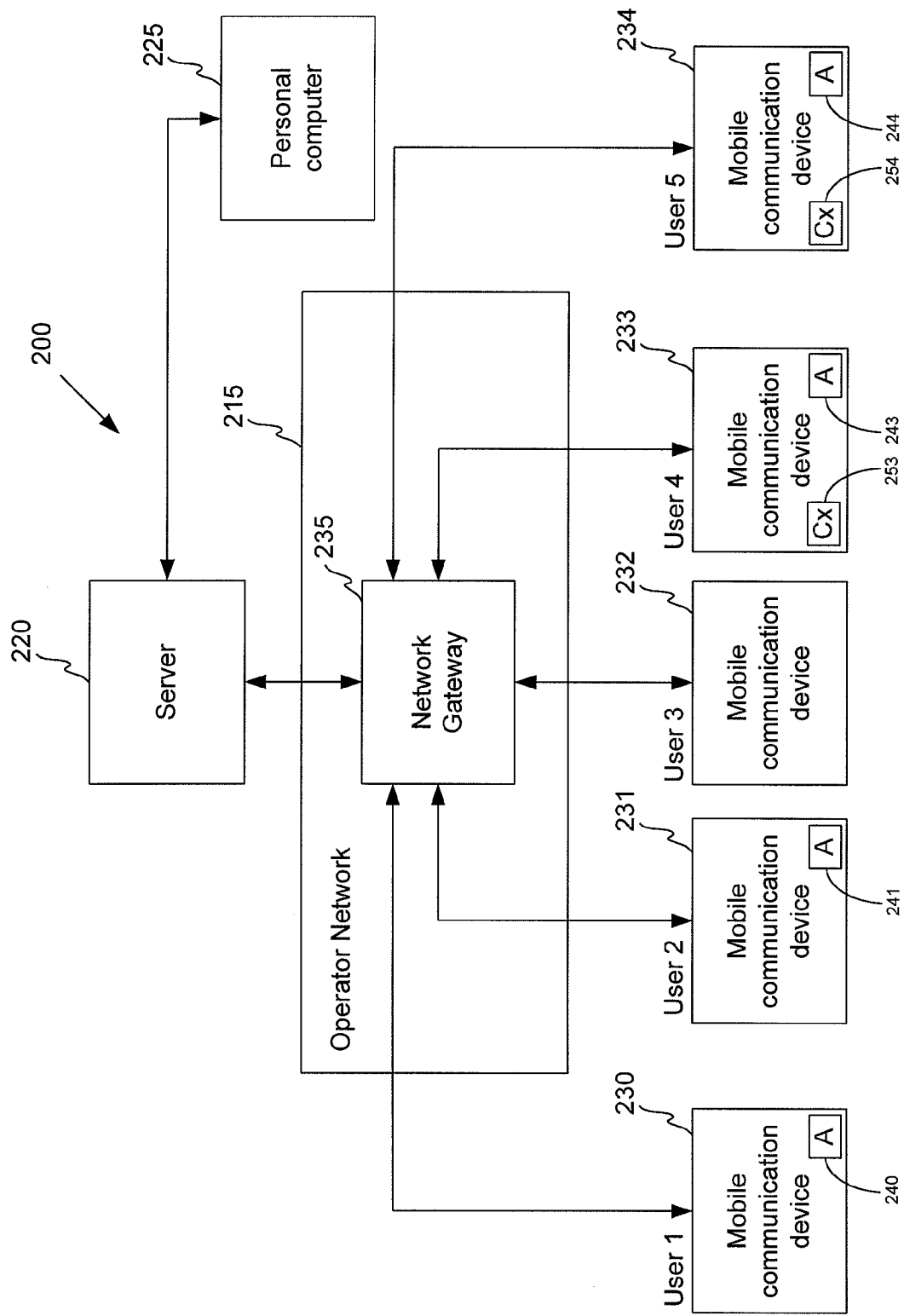
FIG. 3 is a schematic diagram of a communication system.

Referring to FIG. 3, a system 200 includes a service provider 215, a server 220, a personal computer 225, and mobile communication devices 230, 231, 232, 233, 234. The service provider 215, the server 220, and the personal computer 225 are preferably configured in a similar manner as that described above with respect to the service provider 15, the server 20, and the personal computer 25, respectively. Furthermore, the communications device 230, 231, 232, 233, 234 are preferably configured similarly to the mobile communication device 30, but can include or omit other features as described herein (e.g., inclusion of the mobile application). While five of the mobile communication devices are shown, other quantities of mobile communication devices are possible. Furthermore, while a single service provider 215 is shown as providing service to the mobile communication devices 230, 231, 232, 233, 234 multiple service providers 215 can be used. Furthermore, while a single server 220 is shown, other quantities of the server 220 can be used.

The mobile communication devices 230, 231, 232, 233, 234 are configured to include applications that can provide enhanced functionality. In FIG. 3, the mobile communication devices 230, 231, 233, 234 include a mobile application 240, 241, 243, 244, respectively. The mobile communication devices 233, 234 also include a contact information application 253, 254, respectively. The mobile applications 240, 241, 243, 244 are preferably configured in a manner similar to the mobile application 40, although other configurations are possible. For ease of description, throughout the Detailed Description of the present disclosure, the "first user" is the user of the mobile communication device 230, the "second user" is the user of the mobile communication device 231, the "third user" is the user of the mobile communication device 232, the "fourth user" is the user of the mobile communication device 233, and the "fifth user" is the user of the mobile communication device 234.

The contact information applications 253, 254 are configured to provide users of the mobile communication devices 233, 234 the ability to semi-automatically share contact information. For example, the applications 253, 254 are configured such that after a communication event (e.g., a phone call, an SMS message, a text message, an e-mail, an instant message, a page, etc.) between the mobile communication devices 233, 234 has concluded, the fourth user is prompted to provide the fifth user with contact information associated with the fourth user. Once the fifth user receives the contact information associated with the fourth user, the fifth user is prompted to add this information to their contact list, and/or to reply to the fourth user with contact information associated with the fifth user. Exemplary operation and implementations of the applications 253, 254 are described in U.S. application Ser. No. 11/625,091, filed Jan. 19, 2007 and Ser. No. 11/689,915, filed Mar. 22, 2007, both of which are incorporated by reference herein in their entirety.

The operation of the system 200 is dynamic, and can vary depending on the configuration of the mobile devices. As shown in FIG. 3, the mobile devices may or may not include the mobile application or the contact information application. Depending on which mobile devices are involved in a communication event, the system 200 can function in different manners. There are several modes of exemplary operation that are described herein including situations where i) both of the mobile communication devices involved in a communication event include the mobile application, ii) one of the mobile communication devices involved in a communication event includes the mobile application and the other does not, iii) both of the mobile communication devices involved in a communication event include the mobile application and the contact information application, and iv) one of the mobile communication devices involved in a communication event includes the mobile application and the contact information application and the other does not.

While the following discussion assumes that the communication event is a phone call initiated from certain users to other users, other configurations are possible. For example, the communication event could be an SMS message from one user to another user, a text message from one user to another user, an e-mail from one user to another user, an instant message from one user to another user, a page from one user to another user, etc. Furthermore, the following discussion assumes that the setup sequence (e.g., as described in FIG. 2) has already been completed.

The system 200 can be used in a situation where both of the mobile communication devices involved in a communication event include the mobile application. For example, the mobile communication device 230 and the mobile communication device 231 can be involved in a communication event initiated by the mobile communication device 230 (e.g., a call from the mobile communication device 230 to the mobile communication device 231). In this example, the mobile communication devices 230, 231 include the mobile application 240, 241 (e.g., as shown in FIG. 3). To simplify the below description, the user of the mobile communication device 230 will be referred to as the first user, and the user of the mobile communication device 231 will be referred to as the second user.

The mobile application 240 is configured cause a prompt to be displayed on a display of the mobile communication device 230. Preferably, the prompt is presented to the first user after the conclusion of a communication event between the first and second users, although prompts can be presented at other times as well. Preferably, the prompt asks the first user whether or not the first user wishes to invite the second user to join a virtual community associated with the first user (e.g., asking for a yes/no response). The mobile application 240 is configured such that if the first user is associated with more than one virtual community, the first user can be prompted to select one or more virtual communities that the second user should be invited to join.

The mobile application 240 is configured to implement a decision by the first user to invite the second user to join a virtual community associated with the first user. The mobile application 240 is configured to send a notification to the gateway 235 indicating the first user's decision to invite the second user to join a virtual community. The notification can be, for example, an SMS message, although other types of notifications can be used (e.g., other types of messages, network packets, pings, e-mails, phone calls, pages, other types of interoperable transport mechanisms, etc.).

The gateway 235 is configured to determine if the mobile communication device 231 is capable of enhanced service (e.g., whether or not the mobile communication device 231 includes the application 241). The gateway 235 can determine this using, for example, a lookup table. The gateway 235 is configured to send a notification to the mobile communication device 231 having a type that corresponds to whether or not the mobile communication device 231 is capable of enhanced service (e.g., the gateway 235 can send one of several different types of notifications). For example, if the mobile communication device 231 includes the application 241 (which is the case in FIG. 3), the gateway 235 sends a specialized SMS message to the mobile communication device 231 which can be recognized by the mobile communication device 231 (e.g., by the mobile application 241) as a request for the second user to join a virtual community. For example, the mobile application 241 can be configured to recognize the incoming SMS message as an invitation by detecting specific information and/or formatting in the incoming SMS message (e.g., as described in application Ser. No. 11/625,091, filed Jan. 19, 2007, and Ser. No. 11/689,915, filed Mar. 22, 2007 both of which are incorporated by reference herein in their entirety.) Other types of notifications can be detected as well.

The mobile communication device 231 is configured such that the receipt of the notification from the gateway 235 causes the mobile communication device 231 (e.g., using the mobile application 241) to prompt the second user to join the virtual community associated with the first user. For example, the second user can be prompted to respond by selecting a yes or no prompt.

The mobile communication device 231 is configured to send a notification to the gateway 235 that includes information indicative of the response given by the second user. The gateway 235 is configured to send an SMS message to the server 220 with information indicative of the response given by the second user. For example, if the second user agrees to join the virtual community associated with the first user, the gateway 235 sends a notification to the server 220 indicating the same. The server 220 is configured to receive the notification and to associate the first user with the second user in the virtual community (e.g., by linking the MSISDN of the second user to the first user's virtual community account). The gateway 235 can be configured to send a message that causes the mobile communication device 230 to provide a message to the first user that indicates whether the second user accepted the invitation. The server 220 can also be configured to send a notification (e.g., an e-mail or SMS message) to the first and/or second user indicating that the second user accepted the invitation sent by the first user. Furthermore, if the second user is not a member of the virtual community associated with the first user, the notification can prompt and/or provide instructions to the second user to join the virtual community associated with the first user.

Additionally, the mobile application 241 is configured such that second user can also be prompted to invite the first user to become associated with the second user's virtual community. Likewise, the mobile communication device 230 is configured to, upon receiving a reply notification from the mobile communication device 231, via the gateway 235, prompt the user of the mobile communication device 230 to become associated with the virtual community associated with the second user The system 200 can also be used in a situation where one of the mobile communication devices involved in a communication event includes the mobile application and the other does not. For example, the mobile communication device 230 and the mobile communication device 232 can be involved in a communication event initiated by the mobile communication device 230 (e.g., a call from the mobile communication device 230 to the mobile communication device 232). In this example, the mobile communication device 230 includes the mobile application 240, but the mobile communication device 232 does not (e.g., as shown in FIG. 3). To simplify the below description, the user of the mobile communication device 230 will be referred to as the first user, and the user of the mobile communication device 232 will be referred to as the third user.

The mobile application 240 is configured cause a prompt to be displayed on a display of the mobile communication device 230. Preferably, the prompt is presented to the first user after the conclusion of a communication event between the first and third users, although prompts can be presented at other times as well. Preferably, the prompt asks the first user whether or not the first user wishes to invite the third user to join a virtual community associated with the first user. The mobile application 240 is configured such that if the first user is associated with more than one virtual community, the first user can be prompted to select one or more virtual communities that the third user should be invited to join.

The mobile application 240 is configured to implement a decision by the first user to invite the third user to join a virtual community associated with the first user. The mobile application 240 is configured to send a notification to the gateway 235 indicating the first user's decision to invite the third user to join a virtual community.

The gateway 235 is configured to determine if the mobile communication device 232 is capable of enhanced service (e.g., whether or not the mobile communication device 232 includes a mobile application). The gateway 235 can determine this using, for example, a lookup table. As described above, the gateway 235 is configured to send a notification to the mobile communication device 231 having a type that corresponds to whether or not the mobile communication device 231 is capable of enhanced service. Thus, as the mobile communication device 232 does not include the mobile application, the gateway 235 is preferably configured to send an ordinary SMS message to the mobile communication device 232, although other types of notifications can be sent. Preferably, the mobile communication device 232 receives and processes the SMS message from the gateway 235 as an ordinary SMS message. Preferably, the SMS message asks the third user to respond (e.g., via a reply SMS message, or other type of notification) with an e-mail address if the third user wishes to join the virtual community associated with the first user, although other methods of acceptance are possible. The mobile communication device 232 is configured to send an SMS message (or other type of notification)

to the gateway 235 that includes information indicative of an the third user's decision (e.g., an e-mail address associated with the third user).

The gateway 235 is configured such that if it receives a reply SMS message (or other appropriate notification) from the third user that includes an e-mail address, the gateway 235 sends an SMS message to the server 220 with information indicative of the response given by the third user. For example, if the third user agrees to join the virtual community associated with the first user, the gateway 235 sends a notification to the server 220 indicating the same. The server 220 is configured to receive the notification and to associate the first user with the third user in the virtual community (e.g., by linking the MSISDN number of the third user to the second user's virtual community account). The gateway 235 can be configured to send a notification that causes the mobile communication device 232 to provide a prompt to the first user that indicates whether the user of the mobile communication device 232 accepted the invitation. The server 220 can also be configured to send a notification (e.g., an e-mail or SMS message) to the first and/or third users indicating whether the third user accepted the invitation sent by the first user. If the third user is not a member of the virtual community associated with the first user, the notification can also prompt the third user to join the virtual community associated with the first user (e.g., via the web or through a mobile communication device).

The system 200 can be used in a situation where both of the mobile communication devices involved in a communication event include the mobile application and the contact information application. For example, the mobile communication device 233 and the mobile communication device 234 can be involved in a communication event initiated by the mobile communication device 233 (e.g., a call from the mobile communication device 233 to the mobile communication device 234). In this example, the mobile communication devices 233, 234 include the mobile application 243, 244 and the contact information application 253, 254, respectively (e.g., as shown in FIG. 3). To simplify the below description, the user of the mobile communication device 233 will be referred to as the fourth user, and the user of the mobile communication device 234 will be referred to as the fifth user. Furthermore, while the mobile application 243 and the contact information application 253 are shown as separate applications in FIG. 3, the mobile application 243 and the contact information application can be combined into a single application.

The contact information application 253 is configured cause the mobile communication device 233 to prompt the fourth user to provide the fifth user with contact information associated with the fourth user. Preferably, the contact information application prompts the fourth user at the completion of a communication event between the fourth and fifth user, although prompts can be provided at other times. For example, at the conclusion of a communication event, the fourth user can automatically (e.g., by responding to the prompt) provide the fifth user with the fourth user's contact information. An exemplary process to share contact information is described in U.S. application Ser. No. 11/625,091, filed Jan. 19, 2007, and Ser. No. 11/689,915, filed Mar. 22, 2007, both of which are incorporated by reference herein their entirety The mobile application 243 is configured cause an additional prompt to be displayed on a display of the mobile communication device 233. Preferably, the prompt is presented to the fourth user after the conclusion of a communication event between the fourth and fifth users, although prompts can be presented at other times as well. The prompt caused by the mobile application 243 can be provided before or after the prompt provided by the contact information application 253. Preferably, the prompt asks the fourth user whether or not the fourth user wishes to invite the fifth user to join a virtual community associated with the fourth user. The mobile application 243 is configured such that if the fourth user is associated with more than one virtual community, the fourth user can be prompted to select one or more virtual communities that the fifth user should be invited to join.

The mobile application 243 is configured to implement a decision by the fourth user to share contact information and/or to invite the fifth user to join a virtual community associated with the fourth user. The mobile application 243 is configured to cause the mobile communication device 233 to send a notification to the gateway 235 that includes information indicative of whether the fourth user wishes to invite the fifth user to join a virtual community (e.g., as described above) and/or whether the fourth user wishes to share contact information associated with the fourth user. For example, the mobile application can cause the mobile communication device 233 to send an SMS message that includes the fourth user's contact information.

Alternatively, the mobile application 243 and the contact information application 253 can each send a notification indicating the user's respective choices. For example, the mobile application 243 can be configured to send an SMS message indicating that the fourth user wishes to share contact information while the contact information application 253 is configured to send an SMS message indicating that the fourth user wishes to invite the fifth user to join the fourth user's virtual community.

The gateway 235 is configured to, upon receipt of the notification(s) from the mobile communication device 233, determine if the mobile communication device 234 is capable of enhanced service (e.g., whether or not the mobile communication device 234 includes the mobile application 244 and the contact information application 254). The gateway 235 can determine this using, for example, a lookup table. The gateway 235 is configured to send one or more notifications to the mobile communication device 234 having a type that corresponds to whether or not the mobile communication device 234 is capable of enhanced service (e.g., the gateway 235 can send one of several different types of notifications). For example, the mobile communication device 234 includes both the mobile application 244 and the contact information application 254, thus, the gateway 235 preferably sends one or more specialized SMS messages that will be recognized by the mobile application 244 and/or the contact information application 254 as a request for the fifth user to join a virtual community and as a message containing the fourth user's contact information. The mobile communication device 234 can be configured to recognize the notification(s) sent by the gateway 235 by detecting specific information and/or formatting in the incoming notifications e.g., as described in application Ser. No. 11/625,091, filed Jan. 19, 2007, and Ser. No. 11/689,915, filed Mar. 22, 2007 both of which are incorporated by reference herein in their entirety.

The applications 244 and/or 254 are configured to, upon receiving a recognized notification, cause the mobile communication device 234 to prompt the fifth user 1) to add the contact information associated with the fourth user to an address book included in the mobile communication device 234, 2) to provide contact information associated with the fifth user to the fourth user, and/or 3) to join the virtual community associated with the fourth user. The mobile communication device 234 is configured to send one or more notifications to the gateway 235 including information indicative of the responses provided by the fifth user to the various prompts. For example, if the fifth user opts to save the received contact information, and to provide return contact information, the mobile communication device 234 is configured to send a notification to the gateway 235 that includes the contact information associated with the fifth user. If the fifth user wishes to be associated with the virtual community associated with the fourth user, the mobile communication device 234 is configured to send a notification to the gateway 235 indicating the same. The mobile communication device 234 is also configured to send a notification to the server 220 indicating that the fifth user wishes to be associated with the fourth user. If the fifth user wishes to send contact information and join the fourth user's virtual community, the mobile communication device 234 can be configured to send a single notification indicating the same, or send separate notifications, each indicating the fifth user's respective decisions.

The gateway 235 is further configured to determine if the mobile communication device 233 includes the desired applications (e.g., the mobile application 243 and the contact information application 253). The gateway 235 is configured to determine if the mobile communication device 233 includes the desired applications by, for example, consulting a lookup table. Using this information, the gateway 235 can be configured to send one or more notifications to the mobile communication device 233. The one or more SMS messages sent by the gateway 235 to the mobile communication device 233 can include information indicative of, for example, the fifth user's contact information and/or whether or not the fifth user opted to become associated with the fourth user's virtual community. The mobile communication device 233 is configured to, upon receiving a reply notification from the mobile communication device 234 via the gateway 235, prompt the user of the mobile communication device 233 to save the contact information associated with the user of the mobile communication device 234 (if provided) and/or to become associated with a virtual community associated with the fifth user.

The system 200 can be used in a situation where one of the mobile communication devices involved in a communication event includes the mobile application and the contact information application and the other does not. For example, the mobile communication device 233 and the mobile communication device 232 can be involved in a communication event initiated by the mobile communication device 233. In this example, the mobile communication device 233 includes the mobile application 243 and the contact information application 253, but the mobile communication device 232 does not (e.g., as shown in FIG. 3). To simplify the below description, the user of the mobile communication device 233 will be referred to as the fourth user, and the user of the mobile communication device 232 will be referred to as the third user.

The contact information application 253 is configured cause the mobile communication device 233 to prompt the fourth user to provide the third user with contact information associated with the fourth user. Preferably, the contact information application prompts the fourth user at the completion of a communication event between the fourth and third user (initiated by the fourth user), although prompts can be provided at other times. For example, at the conclusion of a communication event, the fourth user can automatically (e.g., by responding to the prompt) provide the third user with the fourth user's contact information. An exemplary process to share contact information is described in U.S. application Ser. No. 11/625,091, filed Jan. 19, 2007, and Ser. No. 11/689,915, filed Mar. 22, 2007, both of which are incorporated by reference herein in their entirety.

The mobile application 243 is configured cause an additional prompt to be displayed on a display of the mobile communication device 233. Preferably, the prompt is presented to the fourth user after the conclusion of a communication event between the fourth and third users, although prompts can be presented at other times as well. The prompt caused by the mobile application 243 can be provided before or after the prompt provided by the contact information application 253. Preferably, the prompt asks the fourth user whether or not the fourth user wishes to invite the third user to join a virtual community associated with the fourth user. The mobile application 243 is configured such that if the fourth user is associated with more than one virtual community, the fourth user can be prompted to select one or more virtual communities that the third user should be invited to join.

The mobile application 243 is configured to implement a decision by the fourth user to share contact information and/or to invite the third user to join a virtual community associated with the fourth user. The mobile application 243 is configured to cause the mobile communication device 233 to send a notification to the gateway 235 that includes information indicative of whether the fourth user wishes to invite the third user to join a virtual community (e.g., as described above) and/or whether the fourth user wishes to share contact information associated with the fourth user. For example, the mobile application can cause the mobile communication device 233 to send an SMS message that includes the fourth user's contact information.

Alternatively, the mobile application 243 and the contact information application 253 can each send a notification indicating the user's respective choices. For example, the mobile application 243 can be configured to send a notification indicating that the fourth user wishes to share contact information while the contact information application 253 is configured to send a notification indicating that the fourth user wishes to invite the third user to join the fourth user's virtual community.

The gateway 235 is configured to, upon receipt of the SMS messages from the mobile communication device 233, determine if the mobile communication device 232 is capable of enhanced service (e.g., whether or not the mobile communication device 232 includes the mobile application and the contact information application). The gateway 235 can determine this using, for example, a lookup table. As described above, the gateway 235 is configured to send one or more types of notifications to the mobile communication device 232 depending on whether or not the mobile communication device 232 is capable of enhanced service. For example, the mobile communication device 232 does not include either of the mobile application or the contact information application, thus, the gateway 235 is configured to send one or more ordinary SMS messages depending on the choices made by the user of the mobile communication device 233, although other types of notifications can be sent. Preferably, the mobile communication device 232 receives and processes the SMS message(s) from the gateway as an ordinary SMS message. Preferably, the SMS message asks the third user to respond (e.g., via a reply SMS message, or other type of notification) with an e-mail address if the third user wishes to join the virtual community associated with the first user, although other methods of acceptance are possible. Preferably, the mobile communication device 232 also receives an SMS message including the fourth user's contact information (e.g., if the fourth user chose to provide it). The mobile communication device 232 is configured to send an SMS message (or other type of notification) to the gateway 235 that includes information indicative of the third user's decision (e.g., an e-mail address associated with the third user).

The gateway 235 is configured to receive and interpret reply notifications from the mobile communication device 232. For example, the gateway 235 is configured to recognize a reply notification message sent from the mobile communication device 232 that includes an e-mail address as an indication that the third user wishes to join the virtual community associated with the fourth user. The gateway 235 is configured to, if appropriate upon receiving the reply notification from the mobile communication device 232, to notify the server 220 that the third user wishes to be associated with the fourth user in the virtual community hosted by the server 220. The gateway 235 can be further configured to send a notification to the mobile communication device 233 indicating that the third user accepted the invitation to join the virtual community. The server 220 can be configured to send a confirmation notification (e.g., e-mail and/or SMS message) to the third user confirming, for example, that the third user has become associated with the fourth user in the virtual community. The confirmation notification can be sent by the server 220 to, for example, the personal computer 225 and/or the mobile communication device 233.

A user can further use the personal computer 225 to implement at least some of the functionality described herein. For example, a user of the personal computer 225 can send an invitation (e.g., via the server 220 and the gateway 235) to the user of the mobile communication device 233 inviting the user of the mobile communication device 233 to become associated with the user of the personal computer 225. As another example, the user of the personal computer 225 can cause the gateway 235 to send an SMS message to the mobile communication device 233, which is recognized by the mobile communication device 233 as including contact information. In response to this SMS message, the mobile communication device 233 is configured to prompt the user of the mobile communication device 233 to save the included contact information in an address book of the mobile communication device 233, and to prompt the user of the mobile communication device 233 to provide a reply SMS to the user of the personal computer 225 that includes contact information associated with the user of the mobile communication device 233.

Figure 4:
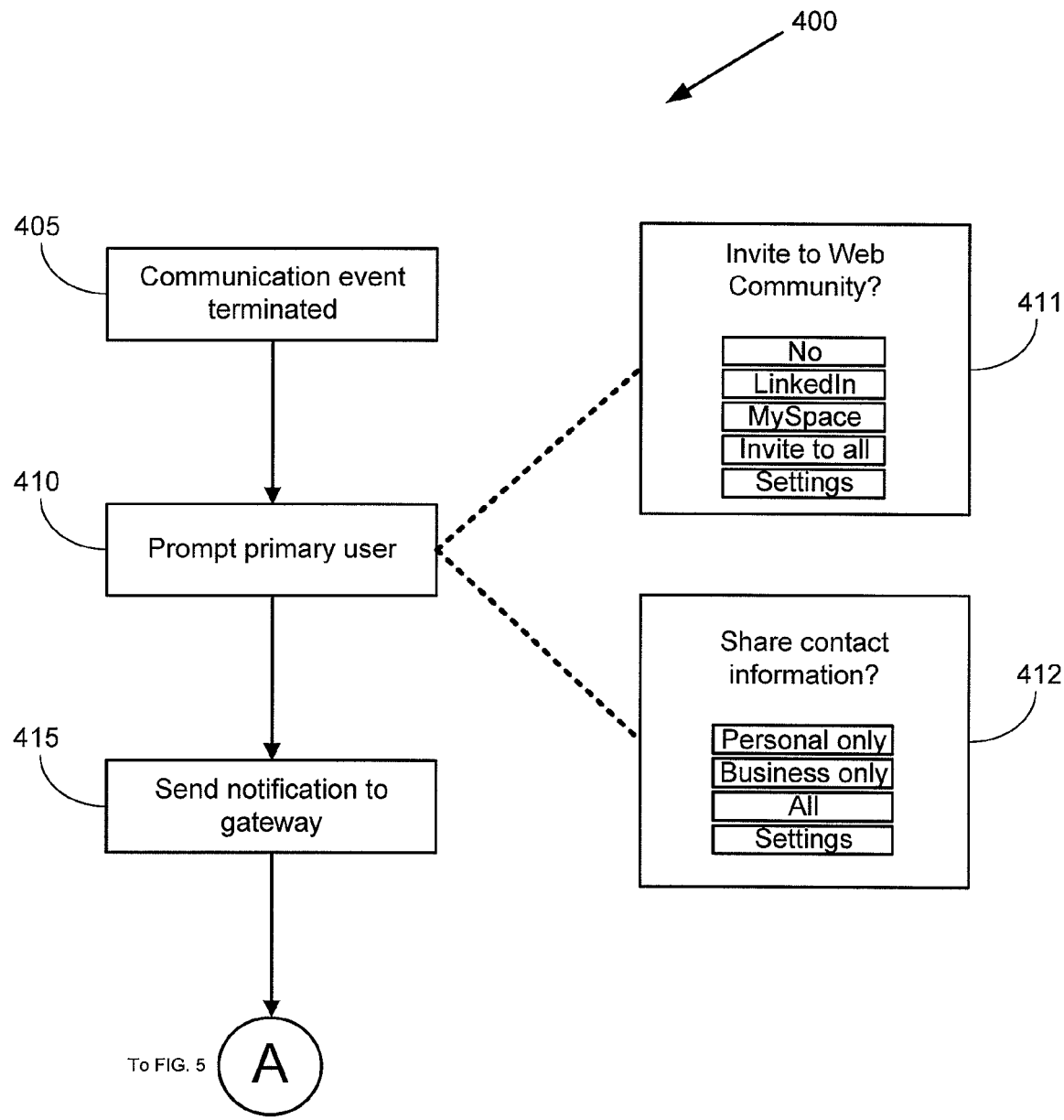
FIG. 4-5 is a diagram of a process carried out by the communication system shown in FIG. 3.
Figure 5:
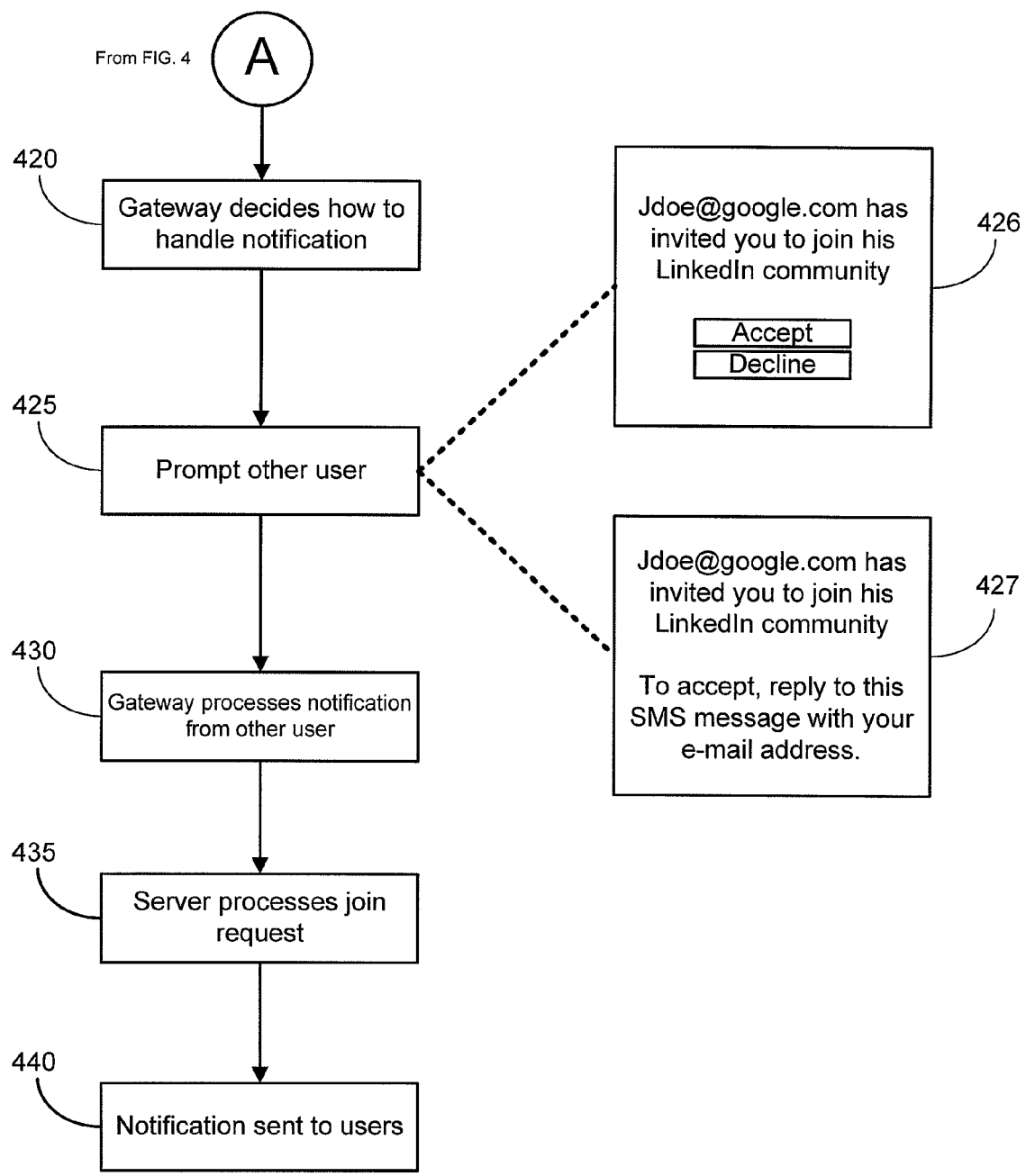

Referring to FIGS. 4-5, with further reference to FIGS. 1-3, an exemplary process 400 for inviting a user to join a virtual community and/or share contact information is shown. The sequence 400, however, is exemplary only and not limiting. The sequence 400 may be altered, e.g., by having stages added, removed, altered, and/or rearranged. While certain stages described below describe prompts provided to the user, these prompts are exemplary only, and other prompts may be provided. While the process 400 is described in the context of a communication event between certain of the mobile communication devices, other mobile communication devices can be used.

At stage 405, the mobile application 243 detects the completion of a communication event that was initiated by the fourth user to another mobile communication device. The mobile application 243 can detect the completion of communication events such as phone calls, SMS messages, text messages, e-mails, instant messages, pages, etc. Preferably, only the mobile application in the mobile communication device that initiated a communication event detects the completion of a communication event, although other configurations are possible (i.e., a call recipient's mobile application may take the "lead" in the exchange process). The communication event described in stage 405 can be to any of the other mobile communication devices.

At stage 410, in response to detecting the completion of a communication event, the mobile application 243 provides one or more prompts to the user. The prompts can be displayed on a display of the mobile application 243, although other prompting methods are possible (e.g., using a text-to-speech converter). The number and type of prompts provided to the fourth user can depend on the applications installed on the mobile communication device 233. For example, if both the mobile application and the contact information application are installed and operating, (e.g., as shown in FIG. 3) then the fourth user is provided with prompts corresponding to both applications. If only the mobile application is installed and operating on the mobile communication device (e.g., mobile communication device 240), then the fourth user is preferably only provided with the prompts corresponding to the mobile application.

The prompt provided by the mobile application 243 asks whether or not the fourth user wishes to invite the other user of the other communication device to join a virtual community associated with the fourth user. If the fourth user is associated with more than one virtual community (e.g., the user initialized several virtual communities during the setup sequence 100) then the user can be prompted with a list allowing the fourth user to select one or more virtual communities to invite the other user to join. An exemplary prompt is shown in prompt 411.

The prompt provided by the contact application 253 asks whether or not the fourth user wishes to share contact information with the other user. If so, the fourth user can also be prompted to decide which contact information to share (e.g., personal, business, etc.) Exemplary prompts are shown and described in prompt 412 and in U.S. application Ser. No. 11/625,091, filed Jan. 19, 2007, and Ser. No. 11/689,915, filed Mar. 22, 2007, both of which are incorporated by reference herein in their entirety.

At stage 415, the mobile communication device sends a notification to the gateway 235. Preferably, a notification is only sent to the gateway 235 if the fourth user decided to invite the other user to join a virtual community and/or if the fourth user decided to share contact information with the other user (although other configurations are possible). The notification sent to the gateway 235 can be, for example, an SMS message, an e-mail, a text message, a phone call, a ping, and other types of network packets and/or interoperable transport mechanisms. The notification sent to the gateway 235 can include information such as a unique identifier of the user (e.g., an MSISDN number, a phone number, etc.), a user name associated with the virtual community, an identification of an associated virtual community, and/or other subscriber-specific information.

At stage 420, the gateway 235 receives the notification from the mobile communication device 233 and determines how to proceed. The gateway 235 determines whether or not the other communication device is capable of enhanced service. For example, as shown in FIG. 3, the mobile communication devices 230, 231, 233, 234 are each capable of enhanced service (e.g., because of the inclusion of one or more applications). The gateway 235 determines if the other communication device is capable of enhanced service by consulting, for example, a lookup table. For example, the gateway can search the lookup table using an MSISDN number and/or other unique identifier.

The gateway 235 is configured to determine which applications are installed and/or operating on the other communication device. For example, by consulting the lookup table, the gateway 235 can determine if the other communication device is operating only the mobile application, or both the mobile application and the contact information application.

After determining if the other communication device is running the mobile application, the gateway 235 sends an appropriate notification to the other communication device. The notification includes information indicating that the fourth user wishes to invite the other user to join the fourth user's virtual community. If the other communication device is running the mobile application, the gateway 235 sends a specialized notification (e.g., an SMS message having a predefined format) to the other communication device. If the mobile application is not running on the other communication device, the gateway 235 sends an ordinary SMS message to the other communication device. Other types of notifications can be sent by the gateway 235.

After determining if the other communication device is running the contact information application, the gateway sends an appropriate notification to the other communication device. The notification includes information indicative of the fourth user's contact information. If the other communication device is running the contact information application, the gateway 235 sends a specialized notification (e.g., an SMS message having a predefined format) to the other communication device. If the contact information application is not running on the other communication device, the gateway 235 sends an ordinary SMS message to the other communication device. Other types of notifications can be sent by the gateway 235.

At stage 425, the other communication device receives the notification from the gateway 235 and processes the notification to display one or more prompts to the other user. How the other communication device processes the notification from the gateway 235 can depend on whether or not the other communication device includes the mobile application and/or the contact information application. For purposes of this stage, it is assumed that i) if the other communication device is running an application, that the corresponding message sent by the gateway 235 is a specialized message, and ii) if the other communication device is not running an application, that the gateway 235 sent an ordinary SMS message. Other configurations are possible.

The mobile application receives the specialized notification and recognizes it as an invitation from the fourth user to join a virtual community. The mobile application can identify the notification by recognizing, for example, a specific format of the notification and/or by recognizing certain information contained in the notification. In response to the notification, the other user is prompted with the invitation sent from the first user. An exemplary prompt is shown in prompt 426.

The contact information application receives the specialized notification and recognizes it as containing the fourth user's contact information. The contact information application can identify the notification by recognizing, for example, a specific format of the notification and/or by recognizing certain information contained in the notification. In response to the notification, the other user is prompted with the option to save the fourth user's contact information. Exemplary prompts are shown and described in U.S. application Ser. No. 11/625,091, filed Jan. 19, 2007, and Ser. No. 11/689,915, filed Mar. 22, 2007, both of which are incorporated by reference herein in their entirety.

In the event that the other communication device receives an ordinary SMS message from the gateway 235, the other communication device preferably receives and processes the SMS message as an ordinary SMS message. For example, the SMS message can be placed into an inbox of the other communication device and/or displayed to the user.

The other communication device is configured to provide a notification to the gateway 235 indicating whether the other user accepted the fourth user's invitation. If the other communication device includes the mobile application, the mobile application sends, for example, a specialized SMS message to the gateway 235 indicating the other user's response. If the other communication device does not include the mobile application, the other communication device sends, for example, an ordinary SMS message to the gateway 235 including information indicative of the other user's response. Alternatively, if the other user refuses the invitation, the other mobile communication device can be configured not to send any notifications. Furthermore, after responding to the prompts presented during stage 425, the other user an also be prompted to invite the fourth user to join a virtual community.

At stage 430, the gateway receives and processes the notification from the other communication device. The gateway analyzes the notification received from the other communication device to determine whether the other user accepted the invitation. For example, the gateway can recognize and interpret a specialized SMS message from the other communication device, and/or can search an ordinary SMS message for information indicative of the other user's response. Upon determining that the other user accepted the invitation, the gateway 235 provides a notification to the server 220 (e.g., the server that is hosting the first user's virtual community). The notification provided by the gateway 235 includes information desired by the server 220. For example, as desired by the server 220, the gateway 235 can collect additional information such as information relating to the communication devices, a MSISDN number, a unique number (e.g., a hash code that is a function of the MSISDN number, etc. If necessary, due to the responses sent by the other user, the gateway can send multiple notifications to different ones of the server 220 (e.g., if the other user accepted invitations to multiple virtual communities hosted on different servers).

At stage 435, the server 220 associates the other user with the fourth user's virtual community. For example, the other user can be added as a "friend" and/or "contact" of the fourth user in the fourth user's virtual community. This can be done, for example, by linking user-specific information (e.g., MSISDN, e-mail address, telephone number, userID, etc.) of the other user to the fourth user in the virtual community.

At stage 440, the server 220 and/or the gateway 235 sends a confirmation notification to the fourth user and/or the other user indicating that the both users are now associated with each other in the virtual community. The confirmation notification can be sent, for example, as an e-mail to the personal computer 25 and/or as an SMS message to the user's mobile communication devices. The confirmation notification can include a link asking the user to acknowledge the confirmation notification. The acknowledgment can be completed by the users through the personal computer 25 and/or through their respective mobile communication devices (e.g., using a web-browser built into the mobile communication device).

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Contact information includes information such as first name, last name, telephone number, employer name, fax number, pager number, mobile phone number, instant messenger ID, e-mail address, OnePIN ID, and other information that a user typically would like to make public. Furthermore, the mobile applications 240, 241, 243, 244 can also be configured such that prompts are suppressed if a user has already invited another user to join a virtual community, and/or has already provided contact information.

While the present disclosure discusses that users of the mobile communication devices can be automatically prompted to send a virtual community invitation and/or contact information at predetermined times (e.g., after the completion of a call, or after an SMS message is received), a user can also navigate to a menu in the mobile communication device and manually send an invitation and/or contact information.

While certain functionality has been described herein as being performed on the personal computers 25, 225 this functionality can also be provided through the mobile communication device itself. For example, i) upon completing the setup process on a mobile communication device, a wireless application protocol (WAP) session can be initiated allowing the user to interact with the virtual community, ii) upon accepting an invitation sent by one user, another user is automatically taken to the virtual community (e.g., for viewing, updating, authentication, etc.) using a WAP session via a mobile communication device, and ii) upon receiving a confirmation notification, a user can access the virtual community using a WAP session via a mobile communication device. While a WAP session is described above, other types of communication and data transport sessions can be used.

Use of the terms like "first user" and "second user" in the Detailed Description is not intended to give any explicit meaning to "first user" and "second user" in the claims. Thus, the "first" and "second" users recited in the claims are not required to use only the mobile communication devices 230 and 231, respectively.

While the present specification incorporates by reference certain prior applications, to the extent that there are any inconsistencies, the present specification shall control.

Further, while the description above refers to the invention, the description may include more than one invention.

What is claimed is:

1. A method comprising:
   detecting, by a first mobile communication device, a completion of a communication event between the first mobile communication device and a second mobile communication device;
   automatically prompting, by the first mobile communication device, in response to the detection of the completion, a first user of the first mobile communication device to invite a second user of the second mobile communication device to become associated with a virtual community associated with the first user, and of which the first user is an existing member;
   sending a first notification from the first mobile communication device to a gateway in response to the first user inviting the second user to become associated with the virtual community;
   receiving, at the first mobile communication device, a second notification from the gateway, in response to an invitation from the second user; and
   prompting the first user to become associated with a virtual community of the second user, where the second user is an existing member of the virtual community of the second user.

2. The method of claim 1 wherein the prompting of the first user occurs automatically in response to the completion of at least one of an e-mail, an instant message, a short message service (SMS) message, and a telephone call.

3. The method of claim 1 further comprising accessing the virtual community using at least one of the first and second communication devices.

4. The method of claim 3 wherein accessing the virtual community includes accessing the virtual community using a wireless application protocol (WAP) session.

5. The method of claim 1, wherein the communication event is a wireless communication event.

6. A non-transitory computer readable medium encoded with computer readable instructions that are configured to cause a processor of a first mobile communication device to:
   detect the completion of a communication event between the first mobile communication device and a second mobile communication device;
   prompt, in response to detection of the completion of the communication event, a first user of the first mobile communication device to invite a second user of the second mobile communication device to become associated with a virtual community associated with the first user, and of which the first user is an existing member;
   send a first notification from the first mobile communication device to a gateway in response to the first user inviting the second user to become associated with the virtual community;
   receive, at the first mobile communication device, a second notification from the gateway, in response to an invitation from the second user; and
   prompt the first user to become associated with a virtual community of the second user, where the second user is an existing member of the virtual community of the second user.

7. The non-transitory computer readable medium of claim 6 wherein the computer readable instructions are configured such that the first notification is a short message service (SMS) message.

8. The non-transitory computer readable medium of claim 7 wherein the computer readable instructions are configured such that the SMS message has a predetermined format that is recognizable by the gateway.

9. The non-transitory computer readable medium of claim 6 wherein the computer readable instructions are further configured to cause the processor to display a prompt to the first user in response to receiving the second notification.

10. The non-transitory computer readable medium of claim 6 wherein the computer readable instructions are further configured such that the detection of the completion of the communication event includes detection of the completion of at least one of an e-mail, an instant message, a short message service (SMS) message, and a telephone call.

11. The non-transitory computer readable medium of claim 6, wherein the communication event is a wireless communication event.

12. A mobile communication device, comprising:
    a processor configured to perform operations including:
    detecting the completion of a communication event between the mobile communication device and a second mobile communication device;
    prompting, in response to detecting the completion of the communication event, a user of the mobile communication device to invite a second user of the second mobile communication device to become associated with a virtual community associated with the first user, and of which the first user is an existing member;

sending a first notification from the mobile communication device to a gateway in response to the first user inviting the second user to become associated with the virtual community;

receiving, at the first mobile communication device, a second notification from the gateway, in response to an invitation from the second user; and prompting the first user to become associated with a virtual community of the second user, where the second user is an existing member of the virtual community of the second user.

* * * * *